May 12, 1959 G. G. BLACKBURN 2,885,840
METHOD FOR INTERNALLY CEMENTING CARTONS AND LAMINATES
Filed March 12, 1956
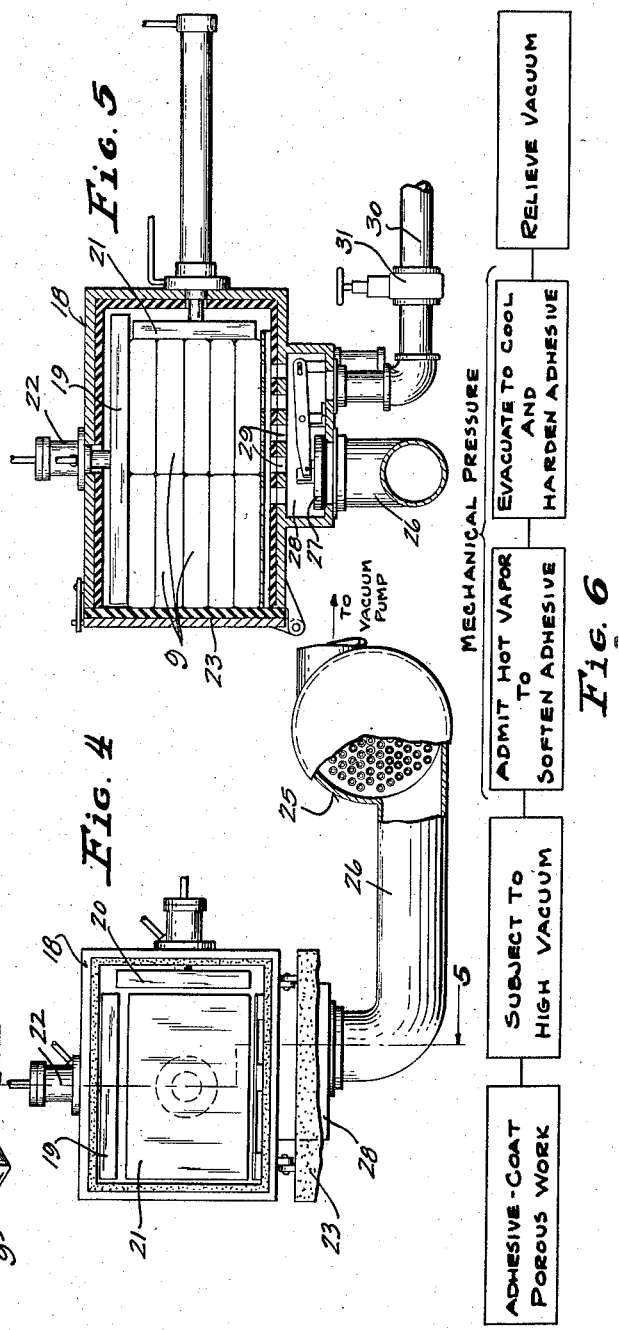
INVENTOR.
GLEN G. BLACKBURN
BY
Wheeler, Wheeler & Wheeler
ATTORNEYS

United States Patent Office 2,885,840
Patented May 12, 1959

2,885,840

METHOD FOR INTERNALLY CEMENTING CARTONS AND LAMINATES

Glen G. Blackburn, Portage, Wis., assignor to The Berst Corporation, Chicago, Ill., a corporation of Illinois Application March 12, 1956, Serial No. 571,042

9 Claims. (Cl. 53—22)

This invention is a method for internally sealing or cementing cartons, boxes, and laminated materials, using thermoplastic cement.

The method is primarily adapted and used by me for the sealing of filled cartons when the cartons are stacked so that there is no way of heating the closures by the usual contact of heated plates. It is also adapted for adhesive connection of fibrous members, as in lamination of wood.

A thermoplastic adhesive which is hard at atmospheric temperatures and softens at elevated temperatures is applied to one or both of the surfaces which are to be joined. Because the adhesive hardens, it can be stored and handled freely. There is no stickiness. When it is desired to render the adhesive effective, the surfaces are placed in contact with each other. Assuming that the surfaces in question are the flaps of a filled carton, the flaps are closed while the adhesive is still hard.

The carton or cartons (or the wooden assemblies to be laminated) are then placed singly or in a stack in a vacuum chamber which is evacuated. Desirably the surfaces to be joined are then subjected to mechanical pressure while vapor at the requisite temperature is admitted to the chamber. The vapor penetrates instantly the pores of fiber board or wood or paper or fabric and instantly raises the coatings or lines or spots of adhesive to the melting point before the contents of a filled carton (for example) are appreciably raised in temperature. The surfaces to be joined being maintained under pressure, the heated vapor is evacuated and condensate evaporated from the heat chamber, thereby causing an instantaneous temperature drop which sets the adhesive instantly, leaving the surfaces permanently adherent.

While reference has been made primarily to the closing of filled cartons, the invention is equally applicable to the laminating of any fibrous material,—even material as hard as wood being sufficiently porous to permit substantially instantaneous penetration by the hot vapor admitted to relieve high vacuum to which the material has been subjected. Thus my method makes it possible to join thick layers of various materials which it would be difficult or impossible to heat by the usual hot plate method.

In the drawings:

Fig. 1 is a view in perspective of a carton which has been stripe-coated with adhesive along the surfaces of its top flaps.

Fig. 2 is a fragmentary detail view similar to Fig. 1 showing a continuous adhesive coating applied to such a flap.

Fig. 3 is a fragmentary detail view of a number of plies of wood coated with adhesive to be laminated together by the process herein disclosed.

Fig. 4 is a diagrammatic view of heating equipment for use in the practice of the invention showing the loading door open.

Fig. 5 is a view taken in section on the line 5—5 of Fig. 4.

Fig. 6 is a diagram of process steps.

All apparatus necessary to an understanding of my method is shown in the drawings. For additional details of apparatus which is usable for the practice of the invention, reference is made to the co-pending application 518,087, filed June 27, 1955 by George E. Grindrod on a Method for Sterilizing Surfaces of Food Materials.

In the practice of my method, those flaps 7 and 8 which are to be outermost in the closing of the carton 9 (Fig. 1) have thermoplastic adhesive applied as at 10 to the surfaces which are to abut flaps 11 and 12 when the carton is closed. Instead of striping the adhesive onto the flaps 7 as shown at 10, the flaps may be coated throughout their contact surfaces as indicated at 100 in Fig. 2.

If the problem is not one of closing a carton but of laminating plies of wood veneer together, the several plies, such as those shown at 13, 14 and 15 in Fig. 3 may have adhesive coated upon their contacting surfaces as indicated at 16. This adhesive may be allowed to harden and the plies handled or stored indefinitely until needed for lamination.

It will be noted that the invention is particularly advantageous in the sealing of cartons. The thermoplastic adhesive can be applied to the desired surfaces when the carton blank is cut or at any subsequent time. Since the adhesive selected is one which is solid and non-sticky at ordinary atmospheric temperatures, it does not interfere with the subsequent handling of the blank or the filling of the carton. The adhesive becomes non-adhesive as soon as it cools. The adhesive used in practice is one which does not soften below the approximate temperature of 160° F., which temperature is stated by way of example and not by way of limitation.

According to my information, all thermoplastic adhesives are suitable for my purposes. Those that have been used successfully are "Proxmelt #12–291–1," a product of Pyroxylin Products, Inc. of Chicago, Illinois; and "Vinylite Resin X–1 5075," a product of Union Carbide Carbon and Chemical Co.

It is also to be noted that thermosetting resinous adhesives may be usable but are objectionable in that they would have to be used wet, whereas the thermoplastic adhesives are applied to the blank by the box manufacturer and remain dry and non-sticky during box erection, filling, and closing.

After the cartons are filled and closed by overlapping their flaps in the usual manner, or after the veneer or plies of wood which have previously been coated have been stacked in the order desired for lamination, in either case the pieces of work are placed in a treating chamber such as that shown at 18 in Figs. 4 and 5. Within this chamber I provide as many pressure plates 19, 20 and 21 as may be required to subject to pressure the surfaces which are to be joined adhesively. For most purposes, a single pressure plate 19 at the top of the chamber will suffice. By way of example, I have shown in Fig. 5 a number of closed cartons 9 stacked beneath the pressure plate 19 which maintains their lapping flaps under pressure exerted by means of ram 22.

The door 23 is now tightly closed and the chamber 18 is evacuated. The vacuum pump as such is not shown but I have indicated in Fig. 4 a condenser at 25 through which gases withdrawn from chamber 18 are passed enroute to the pump. The condenser 25 communicates with the chamber through a conduit at 26, control valve 27, and manifold 28, the latter being opened to the chamber through a number of orifices at 29.

The degree of vacuum is such as to remove the air of the chamber substantially completely and to withdraw substantially all air from the fibrous material which is to be adhesively joined. In practice I evacuate down to 1% of air atmosphere.

When the air removal is practically complete, the vacuum connection is closed and the vacuum is relieved by admitting water vapor or steam at the requisite temperature to the chamber through pipe 30 subject to the control of a valve 31. The steam or water vapor will, of course, be supplied at a temperature sufficient to soften whatever adhesive has been applied to the surfaces which are to be joined. The steam will instantly penetrate the pores of the evacuated fibrous material, thus reaching the surface of the hard adhesive and raising the temperature of the adhesive virtually instantaneously to its melting point.

For many purposes the process may be regarded as complete if rapid cooling is not essential. However, in practice the setting of the adhesive is made virtually instantaneous by a further evacuation step as follows:

While pressure is maintained on the adhesively coated surfaces to be joined, the steam valve 31 is closed and the vacuum valve 27 is opened. The condenser 25 aids in the instantaneous establishment of vacuum in the chamber by condensing the steam withdrawn through the vacuum conduit 26. Since the temperature of the steam within the chamber depends on maintenance of the pressure to which the steam is subjected, the evacuation of the steam and restoration of vacuum and evaporation of condensate in this step of the process bring about an instant temperature drop below the point at which the thermoplastic adhesive congeals to unite the coated surfaces which are maintained under pressure contact during the operation. The degree of vacuum may be varied. In practice I use the same connections originally employed and draw the same degree of vacuum. However, the purpose is somewhat different and any vacuum which will cool the adhesive to set it will suffice. The door of the treating chamber can immediately be opened and the stack of cartons or laminates discharged. In commercial practice, I use a treating chamber which will hold a load of at least 20 cartons for simultaneous sealing.

The depth of the stack of cartons or the thickness of the board or the thickness of the plies of wood to be laminated makes no difference whatever in the time required for sealing, sealing being substantially instantaneous in every case. When the fibrous material has previously been evacuated as above described, a maximum of a few seconds of time is required for steam penetration to all portions of a carton whether the carton is in the middle of a stack or exposed at the outside thereof. If the fibrous material were not initially subjected to vacuum, the steam would not penetrate in this manner.

However, the steam does not penetrate a non-fibrous material such as the thermoplastic adhesive. The adhesive becomes softened because it constitutes a thin coating which is exposed on one or both of its faces to steam at a temperature above the melting point of the plastic. Therefore, the thermoplastic coating melts substantially instantaneously, at the same time accumulating a layer of condensate. When the receptacle is connected to the vacuum pump through the condenser, a few seconds later the condensate re-evaporates and immediately chills the thermoplastic adhesive which hardens as it cools. The whole operation can be conducted as rapidly as the mechanical steps involved will permit. The cycle is extremely short.

As applied to the laminating of wood or paper or other fibrous materials, the process herein disclosed is very markedly more rapid than anything heretofore known. Heated plates have ordinarily been used in laminating operations heretofore. The time for penetration of heat by conductance increases as the square of the thickness to be laminated. To force the heat in this manner through any very thick layer of material may require an unduly high temperature of the plate or an unduly long exposure to the heat. Since water vapor will penetrate instantaneously into the fibers of wood or the like, regardless of thickness, provided only that the air has previously been evacuated as above disclosed, the size of the mass which can be treated is unlimited. The vacuum cooling step is not ordinarily needed for a laminating operation, but it is desirably used if quick cooling is required.

I claim:

1. A method of adhesively joining articles comprising fibrous materials, which method comprises applying a thermoplastic adhesive to the surface of one article, engaging the surface of another article with the adhesively coated surface of the first article, removing gas from fiber pores by evacuating the gases from portions of said articles adjacent said coated surface, and breaking the vacuum by admitting into the presence of such articles vapor at a temperature at which the adhesive softens.

2. The method of claim 1 in combination with the further step of cooling the adhesive to set it by evacuating the vapor to a pressure materially sub-atmospheric.

3. The method recited in claim 1 in which the articles to be adhesively joined comprise the separate flaps of a carton.

4. The method of claim 1 in which the articles to be joined comprise fibrous plies superimposed for lamination.

5. The process of effecting an adhesive connection between porous materials which comprises placing a layer of thermoplastic adhesive between layers of the materials to be joined, removing gas from the pores of said material and melting the adhesive in the absence of gas by direct contact of steam.

6. The process of claim 5 followed by the step of subsequently exposing the materials to high vacuum for exhausting the steam to set the adhesive.

7. The process of claim 6 including the further step of maintaining the several layers under continued pressure during the melting of the adhesive and the exhausting of at least some of the steam.

8. A method of packaging goods which consists of forming and erecting a carton blank having flaps of porous material and coating flap surfaces with a thermoplastic adhesive which is normally hard at atmospheric temperatures and softens at temperatures materially in excess of normal atmospheric temperatures, filling the carton, closing the flaps to bring the adhesive coating on certain of the flaps into face contact with others of the flaps, subjecting the flaps to pressure, evacuating air from the pores of lapping flaps, admitting to the substantially air free flaps steam at a temperature in excess of that required to soften the adhesive, releasing the steam and releasing the pressure.

9. The method recited in claim 8 in which the releasing of the steam is effected by evacuating the steam to a pressure materially below atmospheric whereby condensate formed in the vicinity of the adhesive during the melting thereof is re-evaporated to effect substantially instantaneous cooling of the adhesive.

References Cited in the file of this patent

UNITED STATES PATENTS

| | | |
|---|---|---|
| 2,344,040 | Rogers | Mar. 21, 1944 |
| 2,447,690 | Ekstedt et al. | Aug. 24, 1948 |
| 2,519,102 | Bergstein | Aug. 15, 1950 |
| 2,530,787 | Sonford | Nov. 21, 1950 |
| 2,677,220 | Fischer et al. | May 4, 1954 |
| 2,685,551 | Spokes | Aug. 3, 1954 |
| 2,689,844 | Melamed | Sept. 21, 1954 |
| 2,703,197 | Brasch | Mar. 1, 1955 |
| 2,704,181 | Henderson et al. | Mar. 15, 1955 |
| 2,772,197 | Kozdemba | Nov. 27, 1956 |
| 2,783,176 | Boicey | Feb. 26, 1957 |

FOREIGN PATENTS

| | | |
|---|---|---|
| 473,155 | Canada | Apr. 24, 1951 |